United States Patent
Lee

(10) Patent No.: US 10,491,832 B2
(45) Date of Patent: Nov. 26, 2019

(54) IMAGE CAPTURE DEVICE WITH STABILIZED EXPOSURE OR WHITE BALANCE

(71) Applicant: QUALCOMM Incorporated, San Diego, CA (US)

(72) Inventor: Jisoo Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/678,610

(22) Filed: Aug. 16, 2017

(65) Prior Publication Data

US 2019/0058821 A1    Feb. 21, 2019

(51) Int. Cl.
*H04N 5/235*    (2006.01)
*H04N 5/232*    (2006.01)
*G06T 7/11*    (2017.01)

(52) U.S. Cl.
CPC ............ *H04N 5/2352* (2013.01); *G06T 7/11* (2017.01); *H04N 5/23258* (2013.01); *H04N 5/23267* (2013.01)

(58) Field of Classification Search
CPC .... G06T 7/30; G06T 7/38; G06T 7/11; H04N 5/23267; H04N 5/2327; H04N 5/23274; H04N 5/23277; H04N 5/2329; H04N 5/2352; H04N 5/23258; H04N 5/232123; H04N 5/232945; H04N 5/232121; H04N 5/232122; H04N 9/735; H04N 5/2351; H04N 5/23261
See application file for complete search history.

(56) References Cited

U.S. PATENT DOCUMENTS

| | | | |
|---|---|---|---|
| 6,556,246 B1 * | 4/2003 | Suda | H04N 5/23212 348/208.12 |
| 6,567,265 B1 | 5/2003 | Yamamura et al. | |
| 6,717,816 B1 | 4/2004 | Tanaka et al. | |
| 6,810,451 B2 | 10/2004 | Sasaki | |
| 8,600,189 B2 | 12/2013 | Atanssov et al. | |
| 2005/0057666 A1 * | 3/2005 | Hu | H04N 5/2351 348/229.1 |
| 2006/0066744 A1 | 3/2006 | Stavely et al. | |
| 2006/0215378 A1 | 9/2006 | Durney et al. | |
| 2007/0160359 A1 * | 7/2007 | Imamura | G02B 7/102 396/238 |

(Continued)

FOREIGN PATENT DOCUMENTS

| | | |
|---|---|---|
| EP | 2211304 A2 | 7/2010 |
| WO | 2009064810 A1 | 5/2009 |
| WO | 2015183438 A1 | 12/2015 |

OTHER PUBLICATIONS

International Search Report and Written Opinion—PCT/US2018/039142—ISA/EPO—dated Sep. 20, 2018.

*Primary Examiner* — Shahbaz Nazrul
(74) *Attorney, Agent, or Firm* — Duane Morris LLP

(57) ABSTRACT

A method for image capture control may include computing an electronic image stabilization (EIS) compensation based on image data from an image capture device, the image data having a first region of interest (ROI). A jitter or panning shift is computed based on the EIS compensation. The first ROI is adjusted for use in at least one of the group consisting of an automatic white balance process and an automatic exposure process of the image capture device based on the jitter or panning shift.

25 Claims, 10 Drawing Sheets

(56) References Cited

U.S. PATENT DOCUMENTS

| | | | |
|---|---|---|---|
| 2007/0291152 A1* | 12/2007 | Suekane | H04N 5/23293 348/333.02 |
| 2008/0122940 A1 | 5/2008 | Mori | |
| 2010/0182460 A1* | 7/2010 | Kurokawa | G06T 3/4015 348/240.99 |
| 2010/0309321 A1* | 12/2010 | Brunner | G03B 7/28 348/208.2 |
| 2015/0350533 A1* | 12/2015 | Harris | H04N 5/2355 348/362 |
| 2016/0014359 A1* | 1/2016 | Ota | H04N 5/3696 348/223.1 |
| 2016/0155241 A1* | 6/2016 | Wei | G06K 9/3241 382/103 |
| 2016/0234423 A1* | 8/2016 | Miyazawa | H04N 5/232 |
| 2016/0374222 A1 | 12/2016 | Trout | |
| 2017/0324909 A1* | 11/2017 | Choi | G06T 7/11 |

\* cited by examiner

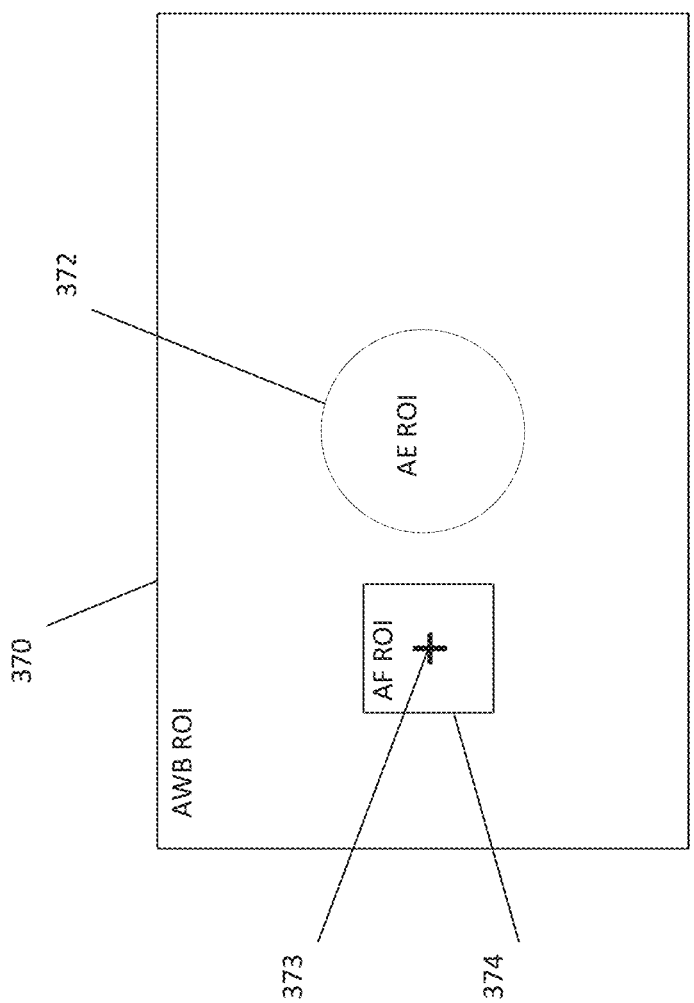

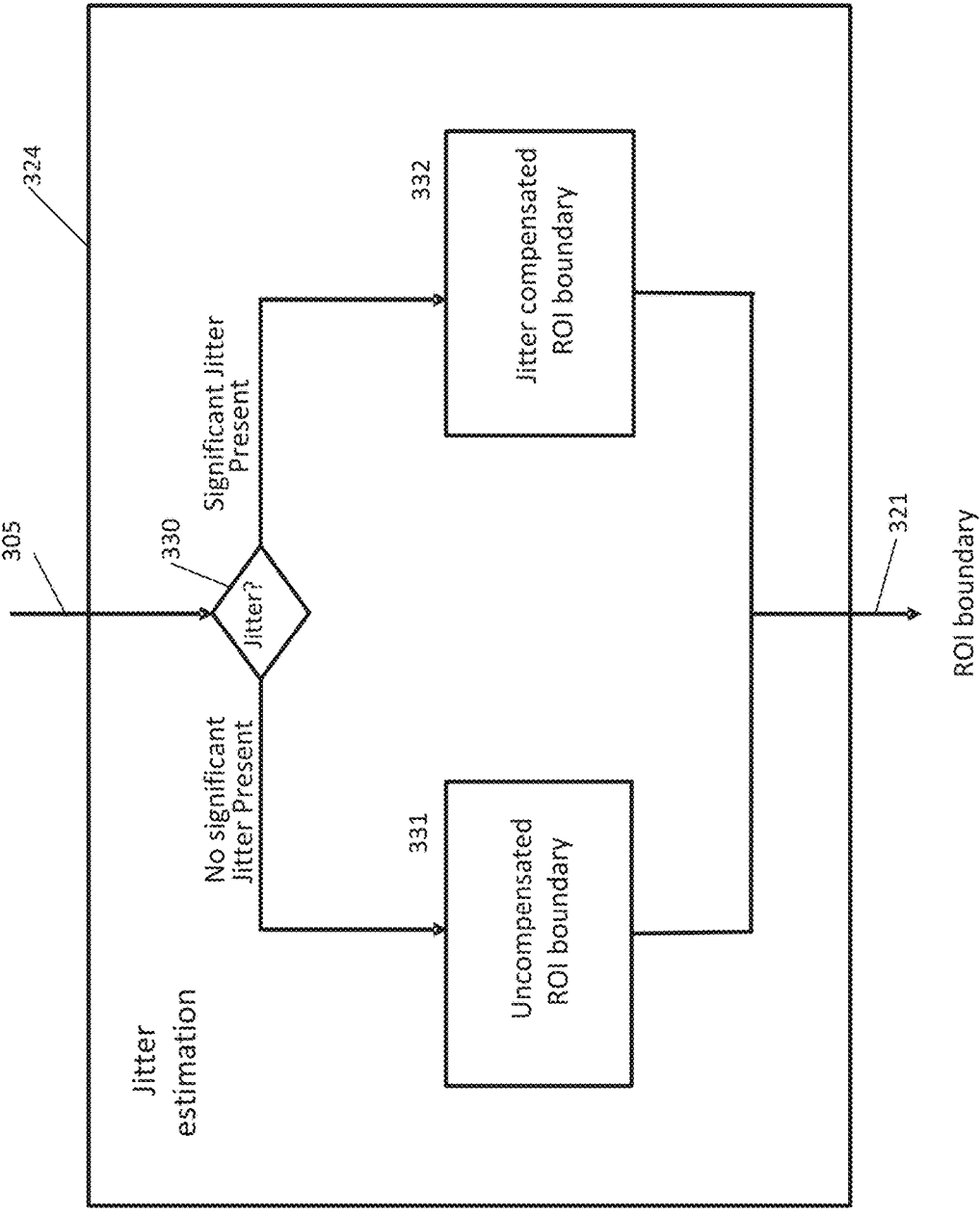

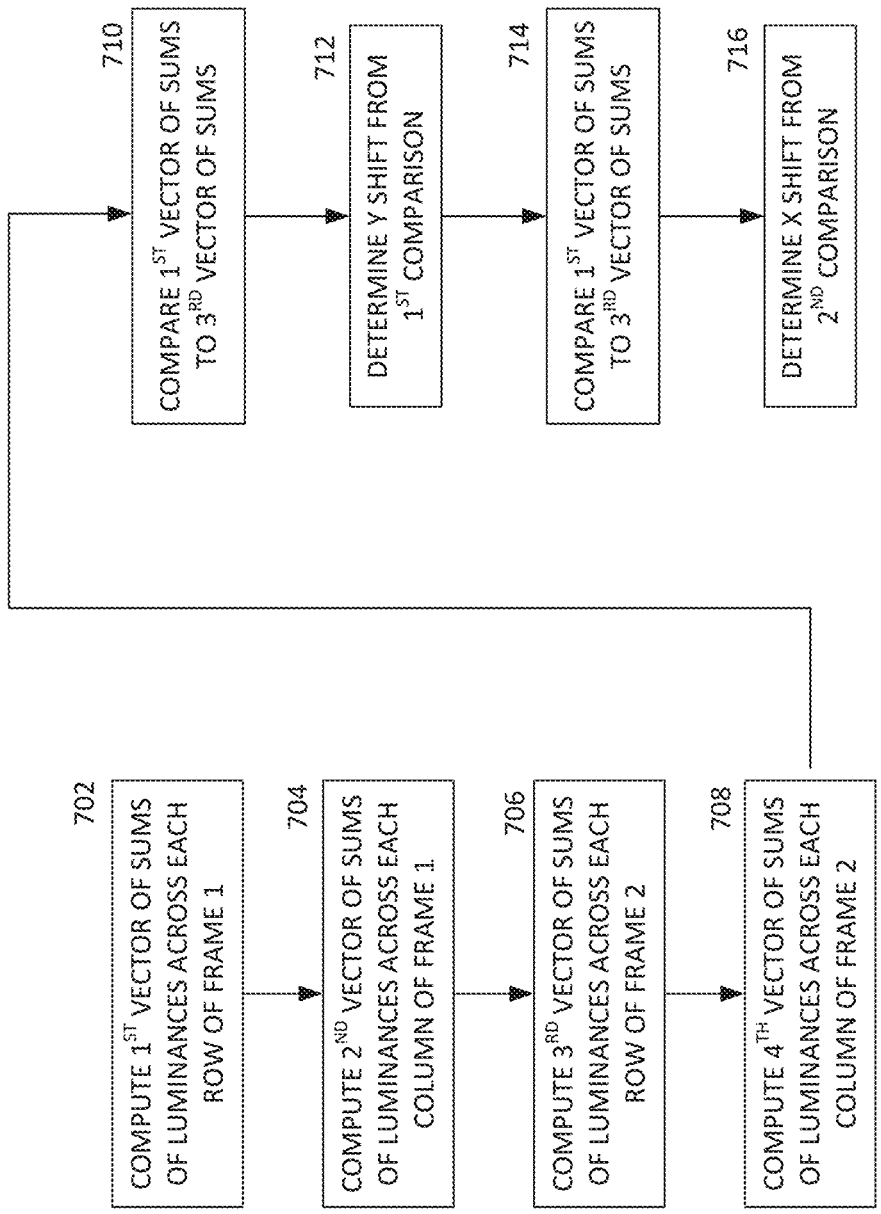

IMAGE CAPTURE DEVICE WITH STABILIZED EXPOSURE OR WHITE BALANCE

CROSS-REFERENCE TO RELATED APPLICATIONS

None

STATEMENT REGARDING FEDERALLY SPONSORED RESEARCH OR DEVELOPMENT

None

BACKGROUND

This disclosure relates to imaging devices generally, and more specifically to automated image capture control.

FIELD

Description of Related Art

Digital image capture devices (e.g., cameras in cell phones, tablets, and laptop computers) use sophisticated image capture and signal processing techniques to render high quality video and still images in spite of their small sensor size. Properly capturing the image data is fundamental to video and still photography. For high quality images, digital image capture devices automatically focus the image capture device's lens for sharpness, set the exposure time for accurate light levels, and adjust the white balance so colors can be reproduced accurately regardless of the color temperature of the light source for the image.

Mobile devices, such as cell phones, tablets, and laptop computers, are often hand-held when capturing an image. Unlike digital single lens reflex (DSLR) cameras and other dedicated video and still cameras, mobile devices lack a mount for securing the mobile device on a tripod. Images captured by a hand-held image capture device ("hand-held images") may be blurred or have artifacts due to camera motion, particularly in low-light settings.

SUMMARY

A method for image capture control may include computing an electronic image stabilization (EIS) compensation based on image data from an image capture device, the image data having a first region of interest (ROI). A jitter or panning shift is computed based on the EIS compensation. The first ROI is adjusted for use in at least one of the group consisting of an automatic white balance process and an automatic exposure process of the image capture device based on the jitter or panning shift.

An image capture control apparatus may include an electronic image stabilizer for outputting a first signal based on image data from an image capture device. The image data have a first region of interest (ROI). A jitter estimator is configured to compute a jitter or panning shift based on the first signal. An ROI adjuster is configured to compute an adjusted ROI based on the jitter or panning shift, for use in at least one of a white balance process or an automatic exposure process of the image capture device.

An image capture control apparatus may include means for outputting a first signal based on image data from an image capture device, the image data having a first region of interest (ROI). A means for estimating a jitter or panning shift is provided based on the first signal. A means for computing an adjusted ROI based on the jitter or panning shift is provided. The adjusted ROI is for use in at least one of the group consisting of a white balance process and an automatic exposure process of the image capture device.

A non-transitory, machine-readable storage medium can be encoded with program code for image capture control. The program code comprises: code for computing an electronic image stabilization (EIS) compensation based on image data from an image capture device, the image data having a first region of interest (ROI); code for computing a jitter or panning shift based on the EIS compensation; and code for adjusting the first ROI for use in at least one of the group consisting of an automatic white balance process and an automatic exposure process of the image capture device based on the jitter or panning shift.

BRIEF DESCRIPTION OF DRAWINGS

FIG. 3C is a diagram showing an example of different regions of interest for automatic white balance, autofocus, and automatic exposure.

FIG. 4 is a high level flow chart of the jitter estimation method of FIGS. 3A and 3B.

FIG. 7 is a detailed flow chart of an exemplary jitter estimation computation.

DETAILED DESCRIPTION

Figure 1:
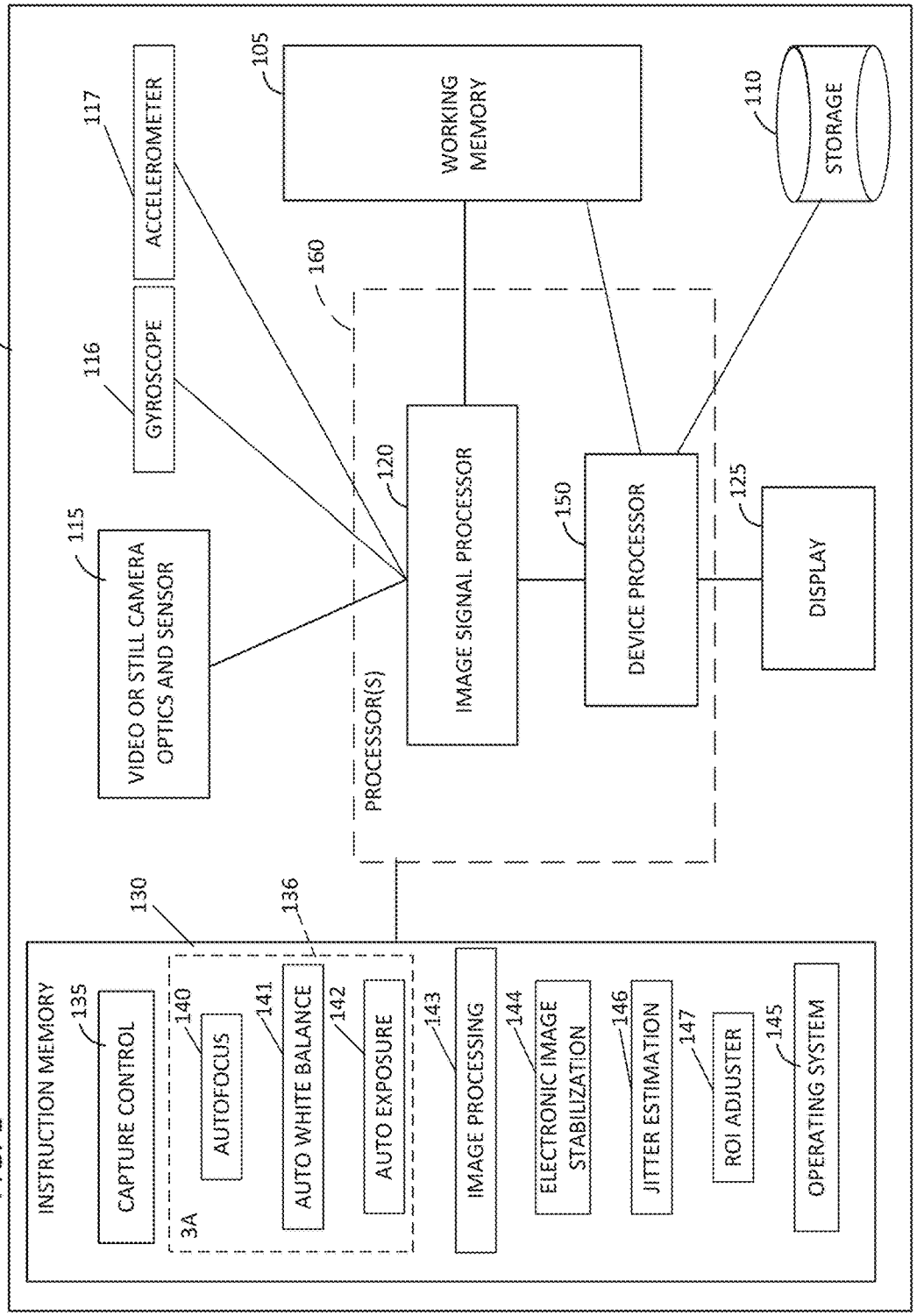
FIG. 1 is a block diagram of an exemplary image capture device having stabilized automatic exposure or stabilized automatic white balance.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) refer to the orientation as then described or as shown in the drawing under discussion. These relative terms are for convenience of description and do not require that the apparatus be constructed or operated in a particular orientation.

This disclosure provides image capture devices with jitter stabilized automatic exposure (AE) and/or jitter stabilized automatic white balance (AWB).

As mobile devices have improved, many mobile devices now include cameras capable of capturing a series of image frames of the same scene or subject in a short period of time (e.g., video or still images in burst mode). In many image capture devices, a series of images of the same scene or subject captured in a short period of time show uneven light levels and color temperature. Color temperature is the temperature of an ideal black-body that radiates light having a color distribution comparable to the color distribution of the source of light reflected off the subject during image capture. Light level and color temperature may exhibit fluctuations, even though the time period was too short for the ambient lighting conditions to change.

Jitter is a camera movement due to camera shake (e.g., due to hand shake or tripod vibration). Jitter can be distinguished from panning motion. Jitter has smaller amplitude than panning motion. Jitter may include translations in three directions and rotations in three directions. An example of jitter motion includes from one to three translations on the order of 1 cm or less, and from one to three rotations on the order of 5-10°. Jitter can change the scene at the edges of the field of view (FOY) of the image capture device. Jitter can also affect focus at shutter speeds that are slow, for a given effective focal length of the image capture device. The direction of jitter motion can oscillate with an irregular, variable period (e.g., from 25 to 150 Hz).

Panning changes the scene within the FOV of the image capture device, and may change the entire scene or a portion of the scene. In many cases, panning primarily includes a rotation about the yaw axis. The yaw axis is parallel to the short sides of the image capture device in landscape mode, and is parallel to the long sides of the image capture device in portrait mode. A panning motion may include any yaw rotation from zero to 360 degrees, such as 90° or 180°, for example. Panning often has a larger amplitude than jitter and usually is not a repeating motion. In some cases, panning includes rotation about both the pitch and yaw axes (e.g., for hand-held panning or panning while the image capture device is mounted on a tripod having a ball-type head. The pitch axis is parallel to the long sides of the image capture device in landscape mode, and is parallel to the short sides of the image capture device in portrait mode. It is also possible for panning to also include a rotation about the roll axis (e.g., switching between landscape and portrait mode) or translations in up to three directions. Jitter can also be present during a panning motion. If the image capture device is hand-held, up to six jitter components (three translation, three rotation) may be present.

Jitter can cause objects to enter or exit the edges of the image frame during a series of frames. If the object entering or exiting the image frame has a different light level or light source from other subjects in the frame, the entry or exit of the object at the edge changes the overall light level and distribution of red, green and blue light in the image ("the histogram"). The AE and AWB systems respond to the changes in the histogram by changing the exposure and white balance settings between images, even though lighting conditions have not changed. The change in the exposure and white balance setting between image frames can be sufficiently large to be detected by a user's unaided eyes.

As described below, hand-held images of a scene or subject captured in rapid succession have more consistent appearance when fluctuations in AE and AWB settings due to unintended image capture device motion ("jitter") are reduced or eliminated. Jitter encompasses image capture device motion resulting from hand shake, floor vibrations, wind, loud sounds, vehicle motion, accidental contact with the image capture device or a tripod or selfie stick on which the image capture device is mounted, or other causes. The AE/AWB stabilization techniques described below can be applied in mobile devices and dedicated cameras. Although the examples below include both AE stabilization and AWB stabilization, the motion compensation can be applied to either AE or AWB alone, or to AE and/or AWB in combination with autofocus (AF). The AE stabilization and AWB stabilization can be applied to video or still images.

FIG. 1 is a schematic block diagram of an exemplary image capture device 100 including at least one processor 160 linked to video or still camera optics and sensor 115 for capturing images. The processor 160 is also in communication with a working memory 105, instruction memory 130, storage device 110 and an optional electronic display 125.

The image capture device 100 and AE/AWB stabilization techniques described herein can provide advantages in many different types of portable and stationary computing devices. The image capture device 100 can also be implemented in a special-purpose video or still camera or a multi-purpose device capable of performing imaging and non-imaging applications. For example, image capture device 100 can be a portable personal computing device such as a mobile phone, digital camera, tablet computer, laptop computer, personal digital assistant, or the like.

The image capture device 100 has video or still camera optics and camera optics and sensor 115, including an image sensor having an array of pixels. Each pixel has a microlens and—in the case of a color image sensor—color filters, including at least two types of phase detection (PD) pixels. The video or still camera optics and camera optics and sensor 115 can also have a primary focusing mechanism that is positionable based, at least partly, on data received from the image signal processor 120. The focusing mechanism positions the optics to produce a focused image of a region of interest (ROI) in the target scene. In some image capture devices 100, video or still camera optics and sensor 115 includes multiple lenses and multiple sensors. The lenses can include front-facing and/or back-facing lenses. The sensors can include color and/or monochrome sensors.

The at least one processor 160 can include multiple processors, such as an image signal processor 120 and a device processor 150. In other embodiments, the processor 160 has a single central processing unit that performs image signal processing and other operations. Image signal processor 120 can include one or more dedicated image signal processors (ISPs) or a software implementation programmed on a general purpose processor. In some examples, the image signal processor 120 performs phase detection operations. Alternatively, an image sensor 200 (shown in FIG. 2, described below) can be configured to perform the phase detection operations.

Referring again to FIG. 1, the image signal processor 120 can control image capture parameters, including but not limited to, autofocus and auto-exposure. The image signal processor 120 can also be configured to perform various image capture operations on received image data in order to execute phase-detection autofocus (PDAF), contrast autofocus, automatic exposure, and automatic white balance. Image signal processor 120 can be a general purpose processing unit or a processor specially designed for imaging applications. Image signal processor 120 also performs several image processing operations including demosaicing, noise reduction and cross-talk reduction. In some embodiments, the image signal processor 120 also performs post-processing functions, such as cropping, scaling (e.g., to a different resolution), image stitching, image format conversion, color processing, image filtering (e.g., spatial image filtering), lens artifact or defect correction, sharpening, or the like.

As shown in FIG. 1, the image signal processor 120 is connected to an instruction memory 130 for storing instructions and a working memory 105. The instruction memory 130 stores a capture control block 135, an autofocus block 140, an automatic white balance block 141, an automatic exposure block 142, an image processing block 143, an electronic image stabilization block 144, a jitter estimation block 146, a region of interest (ROI) adjuster block 147, and an operating system block 145. The instruction memory 130 can include a variety of additional modules that configure the image signal processor 120 of device processor 150 to perform various image processing and device management tasks. Working memory 105 can be used by image signal processor 120 to store a working set of instructions loaded from the function blocks in the instruction memory 130. Working memory 105 can also be used by image signal processor 120 to store dynamic data created during the operation of image capture device 100. For example, in some embodiments, the instruction memory 130 comprises flash memory, and the working memory 105 comprises dynamic random access memory (DRAM).

The capture control block 135 can include instructions that configure the image signal processor 120 to adjust the lens position, set the exposure time, sensor gain, and configure the white balance filter of the image capture device 100, in response to instructions generated during an auto focus operation, for example. Capture control block 135 can further include instructions that control the overall image capture functions of the image capture device 100. For example, capture control block 135 can call the autofocus block 140 to calculate lens or sensor movement to achieve a desired autofocus position and output a lens control signal to the lens.

Autofocus (AF) block 140 adjusts the lens position, so a region of interest (ROI) within the field of view (FOY) of the sensor, corresponding to one or more focus point(s), is focused in the plane of the sensor. The focus point (and thus the AF ROI) can be manually selected by the user, or the image capture device 100 can select one or more focus points based on which object(s) is (are) nearest to the image capture device 100. AF block 140 stores instructions for executing phase detection autofocus (PDAF), contrast autofocus, or laser autofocus. PDAF divides incoming light into pairs of images and captures the divided light rays coming from the opposite sides of the lens, creating a rangefinder. The two images are then analyzed to find a separation (phase) error and determine whether the ROI is focused of the sensor is in focus in the sensor plane. Contrast AF moves the lens through its focal range, stopping at the point where maximal contrast is detected between adjacent pixels. Laser AF shines a laser or light emitting diode (LED) on the subject and calculates the distance based on the time of flight. AF finds the optimal lens position for bringing a region of interest (ROI) into focus in the plane of the sensor.

The region of interest for AF ("the AF ROI") can be a small fraction of the image area (e.g. 10% to 15%). The AF ROI can be manually selected (e.g., by tapping on an ROI in the display), or automatically selected (e.g., by face detection). The AF ROI can be located at the position of any of the focus points of the image capture device 100. Some mobile devices use information from imaging pixels for phase detection autofocus (PDAF), allowing thousands of different regions throughout the FOV of the lens to serve as AF ROI.

Automatic white balance (AWB) block 141 determines the color correction to be applied globally to the image so that neutral objects can be rendered as gray. AWB block 141 determines the illuminating light source under which an image was captured, and scales the components (e.g., R, G, and B) of the image so they conform to the light in which the image is to be displayed or printed. Because the same color temperature is applied globally throughout the image, the ROI for AWB ("the AWB ROI") can include the entire field of view (FOY) of the sensor.

Automatic exposure block 142 determines the length of time that the sensing elements integrate light before being read out. The ambient light is metered, and an exposure time is selected. In the case of a DSLR camera, AE determines the length of time the shutter is open. As the ambient light level increases, the selected exposure time becomes shorter. As the ambient light level decreases, the selected exposure time becomes longer. In many image capture devices 100, the available ROI used by the AE block ("the AE ROI") depends on the metering mode. Most image capture devices include one or more of the following metering modes: spot metering, partial metering, center-weighted metering, or multi-zone metering (also referred to as "matrix metering" and "evaluative metering").

The AE ROI for spot metering can constitute from about 1% to about 5% of the FOV of the sensor, either centered around the center focus point or the current focus point selected by the user. The autofocus system chooses a lens position that focuses light from the current focus point in the plane of the image sensor. Spot metering ensures correct exposure of a specific spot in the image.

The AE ROI for partial metering is approximately 6% to 8% of the FOV of the sensor, centered around the active focus point(s). Partial metering can be used if the FOV has specific bright and dark areas, and the user only wants a specific region to affect the exposure. The partial metering AE ROI contains, and is concentric with, the spot metering AE ROI.

Center-weighted metering uses an AE ROI covering most of the FOV, but the light levels measured near the center region of the sensor are given more weight (e.g., 60% to 85%) than the light levels measured at the periphery of the sensor. The center weighted metering AE ROI is much larger than the spot metering AE ROI or the partial metering AE ROI. The center weighted metering AE ROI contains the spot metering AE ROI and the partial metering AE ROI at its centroid, if the center focus point is being used for spot metering or partial metering. If spot metering or partial metering is using a focus point other than the centroid of the FOV, then the AE ROI for center-weighted metering can be different from, or may overlap, the AE ROI for spot metering or partial metering. The regions containing the spot metering AE ROI and partial metering AE ROI are given the greatest weight in center-weighted metering.

Multi-zone metering uses an AE ROI including multiple regions of the image, and can use proprietary algorithms to analyze the image content and select an optimum exposure setting based on the light levels and the image content. Matrix metering can use empirical data to select an exposure setting considered optimal for a reference image having similar characteristics. Multi-zone metering can be used if the scene is fairly evenly lit. The multi-zone metering AE ROI can include the entire FOV, and thus can be larger than the AE ROIs of all of the other metering modes, as well as additional regions within the FOV of the sensor.

Thus, the image capture device 100 is configured to use three different ROIs, including an AF ROI for performing autofocus, an AE ROI for performing auto exposure and an AWB ROI for performing automatic white balance. These ROIs can be different from each other, as shown in FIG. 3C and described below. The AF ROI can include one or more regions, and can be on the order of 1% of the FOV or less. The AE ROI can vary between 1% and 100% of the FOV of the sensor and contains the AF ROI. Because the center-weighted AE method assigns different weights to different parts of the FOV, it is possible for the AE ROI to give very little weight to the region containing the AF ROI (e.g., in spot or partial metering modes), effectively using an ROI that does not overlap with the AF ROI. The AWB ROI can include 100% of the FOV of the sensor. The AWB ROI contains the AF ROI and contains or coincides with the AE ROI. The AWB ROI may give little weight to the region of the FOV containing the AF ROI, (e.g., in spot or partial metering modes).

In many image capture devices 100, the three blocks AF block 140, AWB block 141 and AE block 142 are included in "3A" engine 136. The 3A engine 136 includes functions that operate on raw image sensor data measured by the image sensor prior to capturing an image. To enhance the speed of focusing the lens, the 3A engine 136 can be implemented in a field-programmable gate array (FPGA) or an application specific integrated circuitry (ASIC), but other embodiments may perform the 3A functions using software code executed by image signal processor 120.

Image processing block 143 can include several processing functions including demosaicing, noise reduction, crosstalk reduction, color processing, gamma adjustment, image filtering (e.g., spatial image filtering), lens artifact or defect correction, image sharpening, or the like.

The electronic image stabilization (EIS) block 144 provides a form of post-capture image processing. The EIS block 144 provides a means for outputting a first signal (319, FIG. 3B) discussed below, based on image data from the image capture device 100. The first signal 319 can contain data representing a motion vector of the image capture device 100. The first signal (motion vector 319) indicates that EIS block 144 is applying motion compensation to an image frame. EIS block 144 positions a cropped pixel array ("the image window") within the total array of pixels on the sensor, as described below in the discussion of FIGS. 2A-2D. The image window includes the pixels that are used to capture images. The image window can include all of the pixels in the sensor, except for a few rows and columns at the periphery of the sensor. The image window is in the center of the sensor while the image capture device 100 is stationary. The peripheral pixels surround the pixels of the image window and form a set of buffer pixel rows and buffer pixel columns around the image window. EIS block 144 shifts the image window from frame to frame of video, so that the image window tracks the same scene over successive frames—assuming that the subject does not move. (If the subject moves, the scene has changed; if the camera is held still except for jitter, EIS tracks the background over successive frames, and shifts the image window in a similar manner EIS cannot remove motion blur, if the image capture device is panned too quickly at any given exposure speed.)

For example, the image window can include at least 95% (e.g., 95% to 99%) of the pixels on the sensor. The first ROI (used for AE and/or AWB) may comprise the image data within the field of view of at least 95% (e.g., 95% to 99%) of the plurality of imaging pixels in the image sensor 200 (FIG. 2) of the image capture device 100 (FIG. 1). A plurality of buffer pixels at the periphery of the sensor (outside of the image window) are reserved as a buffer to allow the image window to shift to compensate for jitter. The image window can be moved so that the subject remains at the same location within the adjusted image window, even though light from the subject impinges on a different region of the sensor. In another example, the buffer pixels can include the ten topmost rows, ten bottommost rows, ten leftmost columns and ten rightmost columns of pixels on the sensor. When the image capture device 100 is stationary, the buffer pixels are not used for AF, AE or AWB, and are not included in the image output. If jitter moves the sensor to the left by twice the width of a column of pixels between frames, the EIS block 144 can shift the image window to the right by two columns of pixels, so the captured image shows the same scene in the next frame as in the current frame. EIS block 144 thus smoothes the transition from one frame to the next.

Jitter estimation block 146 receives inputs from EIS block 144 indicating detection of motion between the most recent two image frames received. Jitter estimation block 146 provides a means for estimating a jitter or panning shift based on the first signal output by the EIS block 144. Optionally, jitter estimation block 146 can receive measurements from one or more inertial sensors (e.g., motion sensors, such as a gyroscope 116 and/or an accelerometer 117). EIS block 144 provides a first signal to the jitter estimation block 146. In an image capture device 100 having a gyroscope 116, the gyroscope 116 provides a second signal to the jitter estimation block 146 indicating a rotation of the image capture device 100. In an image capture device 100 having an accelerometer 117, the accelerometer 117 provides a second signal to the jitter estimation block 146 indicating a translation of the image capture device 100.

In an example, the accelerometer 117 provides a signal to the jitter estimation block 146 indicating a translation of the image capture device 100, and the jitter estimation block 146 uses data from the EIS block 144 to determine the magnitude and direction of the translation.

The jitter estimation block 146 can compute a more general transformation including translation and rotation of the subject. In another example, the jitter estimation block 146 uses an algorithm that accounts for signals from the EIS block 144 and the one or more inertial sensors (e.g., gyroscope 116 and/or accelerometer 117) to determine the jitter and rotation.

ROI adjuster block 147 compares the magnitude of the jitter motion to the size of the region of buffer pixels available at the periphery of the sensor. ROI adjuster block 147 provides a means for computing an adjusted ROI based on the jitter or panning shift, for use in a white balance process and/or an automatic exposure process of the image capture device 100. ROI adjuster block 147 determines whether enough buffer pixels are available at the appropriate edge of the sensor for shifting the AE ROI, AWB ROI (and optionally, the AF ROI), corresponding to the image window shift initiated by the EIS block 144. In response to a determination that enough buffers are available to compensate for the jitter, the ROI adjuster adds buffer pixels to one side of the image window, and removes the same number of pixels from the opposite side of the image window, effectively moving the AE ROI and AWB ROI to track the shift in the image window. In response to a determination that insufficient additional buffers are available on one side to compensate for the jitter, the ROI adjuster can add virtual pixels to the one side of the ROI. The virtual pixels have luminance and chroma values extrapolated from the pixels at the edge of the sensor. The ROI adjuster block 147 removes the same number of pixels from the opposite side of the image window effectively moving the ROI.

In an image capture device 100 having ROI adjuster block 147, the AE block 142 and AWB block 141 provide means for computing an exposure time and/or a color temperature for an image frame using image data corresponding to the adjusted ROI. In some image capture devices 100, a 3A engine 136 provides the means for computing an exposure time and/or a color temperature for an image frame using image data corresponding to the adjusted ROI.

The 3A engine 136 can incorporate AF block 140, AWB block 141 and AE block 142 in a single processing engine. The AF block 140 provides a means for selecting an autofocus ROI to be used by the autofocus control system of the image capture device 100. The exemplary 3A engine 136 is configured so that the AWB ROI and AE ROI can be different from each other, different from the first ROI (the original AF ROI), and different from the adjusted AF ROI. For example, the ROI adjuster block 147—the means for computing an adjusted ROI based on the jitter or panning shift—is configured to select the adjusted AE ROI and AWB ROI to be larger than the autofocus ROI. For example, the AE ROI and AWB ROI can include the entire FOV, while the AF ROI may be a spot occupying 5% of the FOV.

In some embodiments, the ROI adjuster block 147 adjusts the boundary of the ROI every time the EIS block 144 processes an image frame. In other embodiments, the ROI adjuster block 147 adjusts the ROI boundary less frequently. For example, ROI adjuster block 147 can adjust the ROI every second, third, or fourth image frame. In other embodiments, the ROI adjuster block 147 adjusts the boundary of the ROI every time the EIS block 144 shifts the image window.

Operating system block 145 acts as an intermediary between programs and the processor 160. For example, if the image capture device 100 is a mobile phone or tablet, the operating system can be "APPLE iOS"™, from Apple, Inc., Cupertino, Calif. or any other operating system for a mobile phone or tablet. If the image capture device 100 is a computer, the operating system block 145 can be 'WINDOWS'™ sold by Microsoft Corporation of Redmond, Wash. or any other operating system for a computer. Operating system block 145 can include device drivers to manage hardware resources such as the video or still camera optics and sensor 115. Instructions contained in the image processing blocks discussed above interact with hardware resources indirectly, through standard subroutines or application program interfaces (APIs) in operating system block 145. Instructions within operating system block 145 can then interact directly with these hardware components. Operating system block 145 can further configure the image signal processor 120 to share information with device processor 150.

Device processor 150 can be configured to control the display 125 to display the captured image or a preview of the captured image to a user. The display 125 can be external to the image capture device 100 or can be part of the image capture device 100. The display 125 can be configured to provide a view finder displaying a preview image prior to capturing an image. The display 125 can comprise a liquid crystal display (LCD), light emitting diode (LED), or organic light emitting diode (OLED) screen, and can be touch sensitive.

Device processor 150 can write data to storage device 110. The data can include data representing captured images, data generated during phase detection and/or metadata, e.g., exchangeable image file format (EXIF) data. While storage device 110 is represented schematically as a disk device, storage device 110 can be configured as any type of storage media device. For example, the storage device 110 can include a disk drive, such as an optical disk drive or magneto-optical disk drive, or a solid state memory such as a FLASH memory, random access memory (RAM), read-only memory (ROM), and/or electrically-erasable programmable ROM (EEPROM). The storage device 110 can also include multiple memory units.

Although FIG. 1 shows an image capture device 100 having separate components to implement a processor 160 and working memory 105, in other examples these separate components can be combined in a variety of ways. For example, in an alternative example (not shown), the memory components can be combined with processor components in a system on a chip (SOC).

Figure 2B:
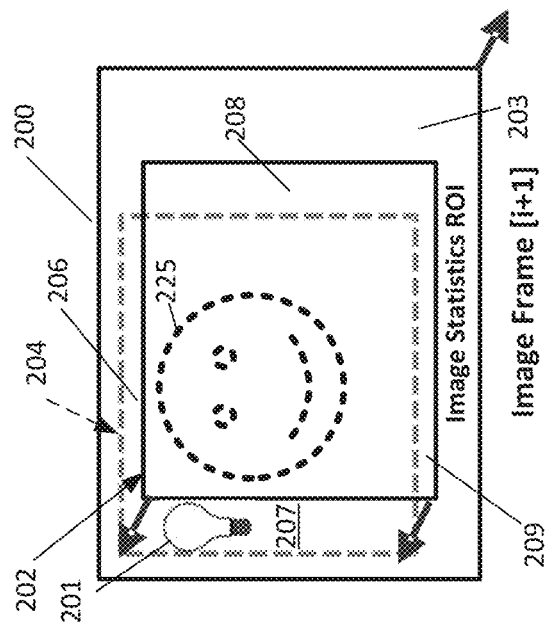
FIGS. 2A-2D are diagrams showing how jitter can affect automatic exposure or automatic white balance, and how the image capture device of FIG. 1 can compensate for the jitter.
Figure 2A:
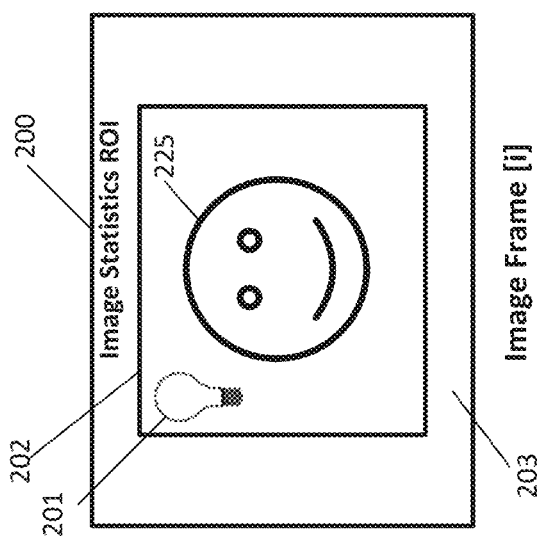

FIGS. 2A to 2D schematically demonstrate ROI adjustment as performed by the ROI adjuster block 147. FIG. 2A shows light from a scene including face 225 and light bulb 201 focused on the image sensor 200. The face 225 is centered within the image window 202 within the image sensor 200. The individual pixels in image sensor 200 are omitted for ease of viewing. The peripheral region 203 of the image sensor 200 contains buffer pixels (not shown) which are outside of the image window 202 when the image capture device 100 is stationary. For ease of illustration, assume that the image capture device 100 uses multi-zone metering, and the AE ROI and AWB ROI both coincide with the entire image window 202. The face 225 is in the center of the image window 202. A bright object (e.g., a light bulb 201) is located inside of the image window and inside the AE ROI for light metering. The light bulb 201 inside the image window contributes to the metered light level and lowers the average color temperature for a "warm" white balance. (Red and orange light have lower color temperatures than blue light, but red and orange light are customarily referred to as "warm" and blue light is customarily referred to as "cool".)

FIG. 2B shows the same image sensor 200 after jitter causes the image sensor 200 to move downward and to the right, causing light from the scene to impinge on image sensor 200 beyond the upper left corner of the original image window 202. The face 225 is off center with respect to image window 202, and the light bulb 201 is outside the image window 202. To compensate for the sensor motion, the EIS block 144 updates the image window with an X shift and a Y shift. The X shift includes adding buffer pixels in region 207 to the image window for the next frame and removing pixels in region 208 from the image window for the next frame. The Y shift includes adding buffer pixels in region 206 to the image window for the next frame and removing pixels in region 209 from the image window for the next frame. As a result, the image window shifts upward and leftward to keep the face 225 in the same location with respect to the adjusted image window 204 (as shown in phantom). The left buffer pixels added to the image window are indicated by L-shaped region 207. The right buffer pixels removed from the image window are indicated by L-shaped region 208. Adjusted image window 204 includes the image window 202, plus the added region 207, minus the removed region 208. The adjusted image window 204 is indicated by the entire dashed square.

Following the image window shift, the light bulb 201 is again located within the adjusted image window 204, contributing to the light level. Without an AE ROI adjustment, the AE block 142 would set the exposure time based on the original AE ROI—coinciding with original image window 202 in this example—which no longer contains the light bulb 201. The exposure time would be too long, overexposing the image. The AWB block 141 would not take the warm light from light bulb 201 into account, and will set the color temperature to a value suitable for cooler lighting. To avoid over-exposure and incorrect white balance, the ROI adjuster block 147 adds buffer pixels in regions 206 and 207 to the AE ROI and AWB ROI, and removes pixels in regions 208 and 209 from the AE ROI and AWB ROI as shown in phantom, consistent with the change in the image window. Following the ROI adjustment, the light bulb 201 is inside the adjusted AE ROI and AWB ROI, corresponding to the adjusted image window 204. The exposure time is reduced for proper exposure, and the white balance again reflects warmer light. This is just a simplified example, and AE ROI can be (and frequently is) different from the AWB ROI and the image window.

Figure 2D:
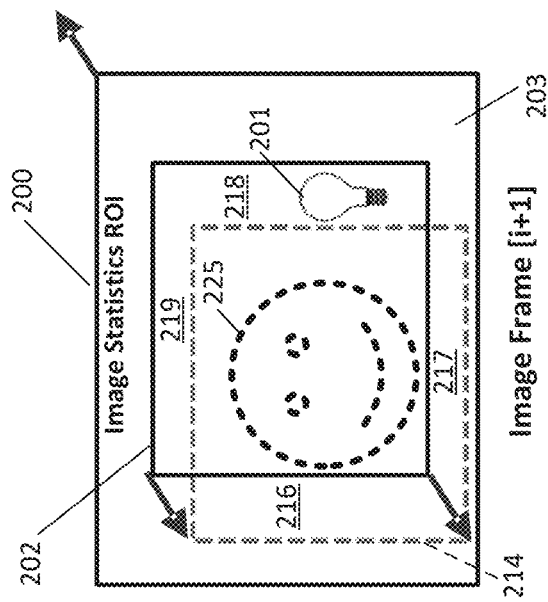
Figure 2C:
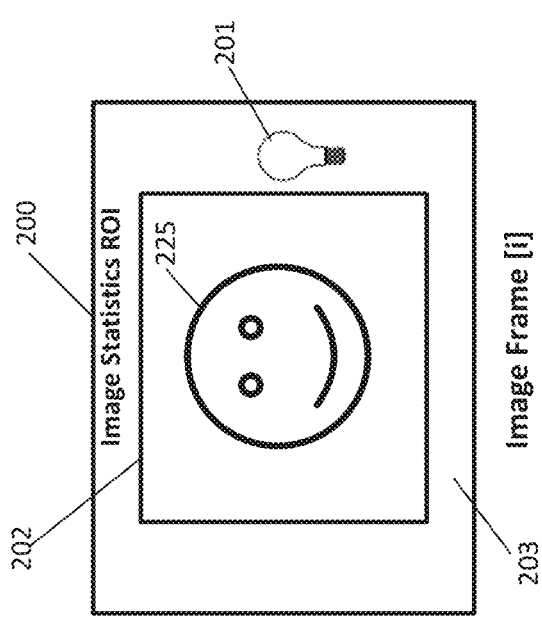

FIG. 2C shows the same image sensor 200 imaging the same subject (i.e., face 225) as shown in FIG. 2A. In FIG. 2C, the light bulb 201 is outside of the image window. Assuming the face 225 is not illuminated by the light bulb 201, the light from light bulb 201 does not contribute substantially to the light level metered in the image window 202. Without the "warm" light from the light bulb 201, the AWB block 141 sets the white balance for "cool" light.

FIG. 2D shows image sensor 200 after jitter causes the image sensor 200 to move upward and to the right, causing light from the scene to impinge on image sensor 200 beyond the lower left corner of the original image window 202. The face 225 is off-center, and the light bulb is now within the original image window 202. To compensate for the sensor motion, the EIS block 144 updates the image window with an X shift and a Y shift. The X shift includes adding buffer pixels in region 218 to the image window for the next frame and removing pixels in region 216 from the image window for the next frame. The Y shift includes adding buffer pixels in region 217 to the image window for the next frame and removing pixels in region 219 from the image window for the next frame. As a result, the image window shifts downward and leftward to keep the face 225 in the same location relative to the adjusted image window 204 (as shown in phantom).

Following the image window shift, the light bulb 201 is located outside the adjusted image window 214, reducing the light level and the "cool" light. Without an AE ROI adjustment, the AE block 142 would set the exposure time based on the original AE ROI—coinciding with original image window 202—which now contains the light bulb 201. The AE will set the exposure time too short, and white balance setting will be suitable for "warm" light, even though the light bulb is not inside the adjusted image window 214. To avoid under-exposure, the ROI adjuster block 147 adds buffer pixels in regions 216 and 217 to the AE ROI and AWB ROI, and removes pixels in regions 218 and 219 from the AE ROI and AWB ROI as shown in phantom, consistent with the change in the image window 214. Following the AE ROI adjustment, the light bulb 201 is outside the adjusted AE ROI. The AE block 142 sets the exposure properly. Similarly, the ROI adjuster block 147 updates the AWB ROI, so the color temperature is measured for a cooler light source, without the warm light of the light bulb 201.

Figure 3A:
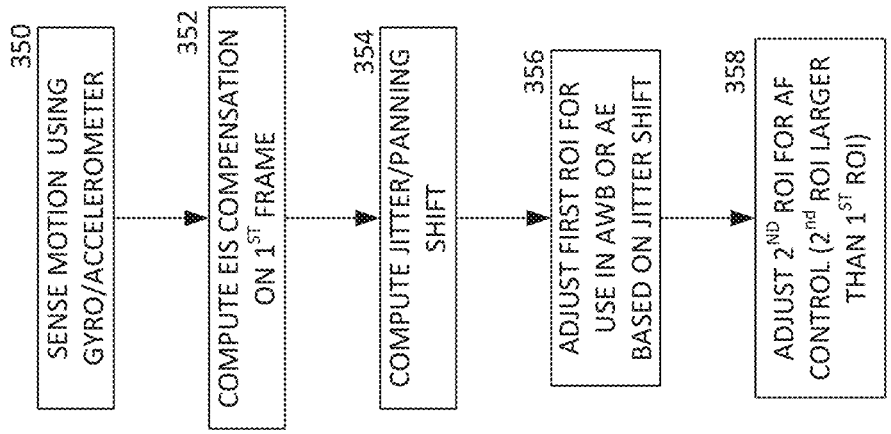
FIG. 3A is a high level flow chart of a method for stabilizing automatic exposure or stabilizing automatic white balance using the image capture device of FIG. 1.

FIG. 3A is a flow chart of an exemplary method for adjusting the AE ROI or AWB ROI for image capture control.

At block 350, the 3A engine 136 receives sensor data from at least one inertial sensor (e.g., gyroscope 116 and/or accelerometer 117) indicating image capture device 100 is moving (e.g., translating or rotating).

At block 352, in response to the sensor data, EIS block 144 computes an electronic image stabilization (EIS) compensation for the current (first) image frame based on image data from the image capture device 100. The image data has a first region of interest (ROI), for AE and AWB operations. The EIS block 144 adjusts the location of the first image window 202 within the image sensor 200, so that the subject in the first frame remains at the same location within the image window that the subject had in a previous frame, even though the sensor has moved relative to the subject between the previous frame and the first frame. Because the 3A engine 136 (FIG. 1) computes statistics before the first image frame is captured, and EIS block 144 (FIG. 1) computes the ROI shift after the first image frame is captured, the ROI shift computed based on the first frame will be provided to the 3A engine 136 for use by AF block 140, AWB block 141 and AE block 142 (all shown in FIG. 1) for generating 3A statistics for the second frame. That is, the shift identified by EIS block 144 is used to compensate for motion in the image data of the current (first) frame and provided to 3A engine 136 (FIG. 1) to adjust the ROIs for 3A statistics generation for the next (second) frame. In other words, the application of the shift to the ROI for 3A's statistics can lag one frame behind the application of the same shift amount to the image window shift for motion compensation.

At block 354, jitter estimation block 146 computes a jitter or panning shift based on the EIS compensation. In response to determining that both jitter and panning are occurring, the EIS compensation can divide the motion of the image capture device 100 into a panning shift component and a jitter component by analyzing the motion acceleration components and/or the rotation components. For example, a rotation about a vertical axis without any horizontal acceleration indicates panning. The difference between the total detected motion and the rotation is due to jitter.

At block 356, based on the jitter or panning shift, the ROI adjuster block 147 adjusts the first ROI for use in an AWB process or an AE process of the image capture device 100, or for use in both the AWB process and the AE process. In the case where the jitter estimation block 146 determines that both jitter and panning are present, the ROI adjuster block 147 can adjust the first ROI to compensate for the jitter component, without compensating for the panning shift component. This allows AWB block 141 and/or AE block 142 to change the color temperature and/or exposure time to match the change in scene due to panning, without introducing additional fluctuations in color temperature and/or exposure time due to jitter. Alternatively, if the amplitude of the panning is on the same order of magnitude as the jitter motion, the ROI adjuster block 147 can adjust the first ROI to compensate for both the jitter component and the panning.

At block 358, in some image capture devices 100, the ROI adjustment may include adjusting a second ROI (e.g., the AF ROI) for use in AF control, where the first ROI (e.g., the AWB ROI for AWB and/or the AE ROI for AE) and the second ROI (for AF) for a single image frame are different from each other. For example, the first ROI is often larger than the second ROI. For example, as shown in FIG. 3C, the first ROI (AWB ROI 370) can include the entire FOV of the image sensor. The second ROI (e.g., AE ROI 372) depends on the metering mode, and may be about 6-8% of the FOV for partial metering as shown in FIG. 3C. The AF ROI 374 can be about 15% of the FOV, and can be located with the focus point 373 centered within the AF ROI. Thus, in the example of FIG. 3C, the AF ROI 374 and the AE ROI 273 are different sizes and do not overlap each other, while the AWB ROI 370 occupies the entire FOV of the image capture device 100, and contains the AF ROI 374 and the AE ROI 372.

Figure 3B:
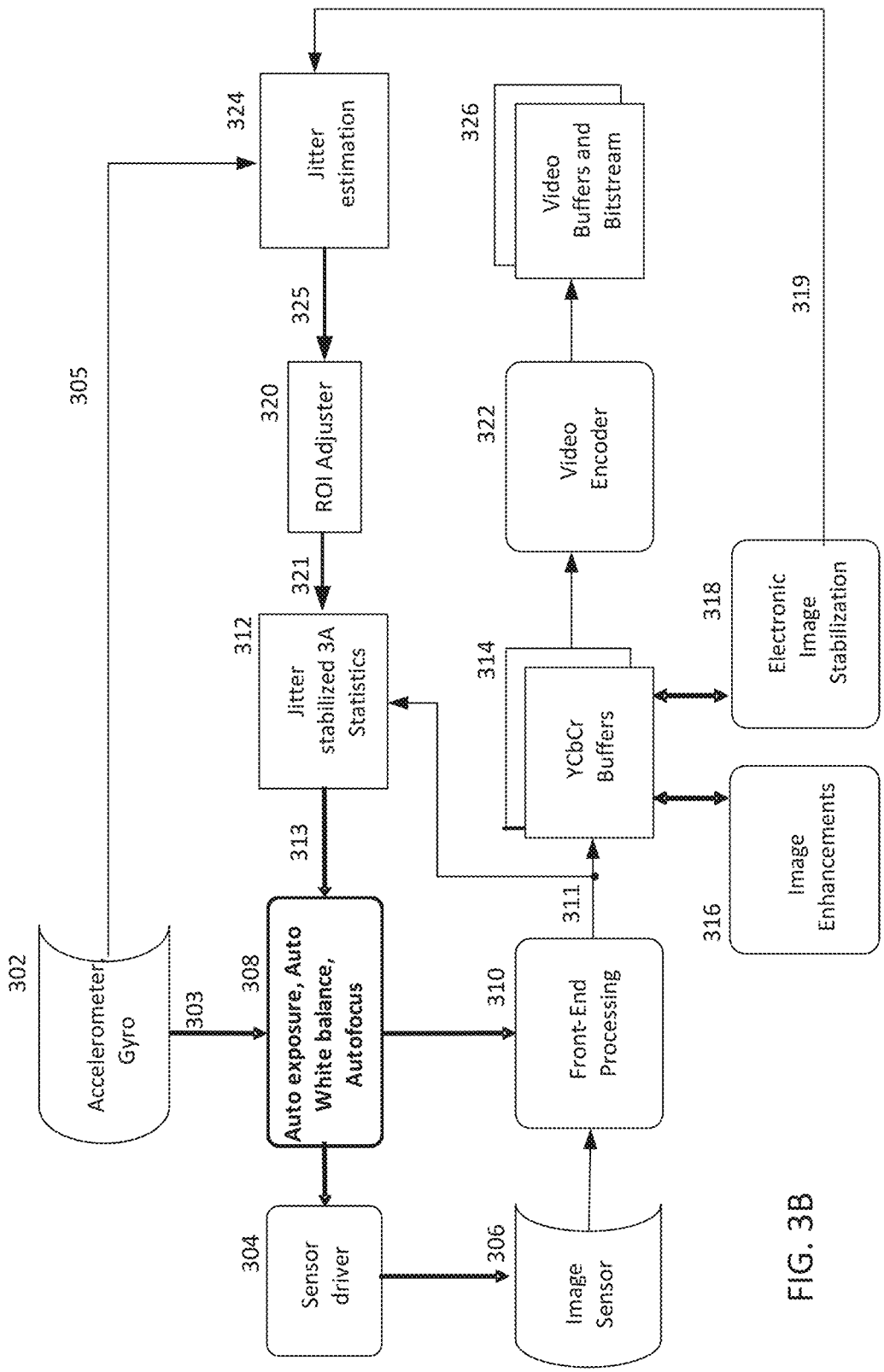
FIG. 3B is a detailed schematic diagram showing a method for stabilizing automatic exposure or stabilizing automatic white balance using the image capture device of FIG. 1.

FIG. 3B is a detailed schematic diagram of the operation of the image capture device 100 of FIG. 1.

The user activates the focusing operation, e.g., by tapping a point on the display 125 of the image capture device 100 to select a focus ROI, or a camera application activates the focusing operation on its own by, for example, face detection.

In inertial sensor (e.g., accelerator/gyro) block 302, in the case of image capture devices having a motion (inertial) sensor 302 (e.g., an accelerometer 116 or gyro 117, FIG. 1), the inertial sensor 302 provides a signal 303 to the 3A engine 308 and provides a signal 305 to the jitter estimation block 324.

In block 304, the sensor driver 304 operates the image sensor 306 to collect sensor data for autofocusing the lens. The sensor data can include PD pixel values and or imaging pixel values. The image sensor 306 outputs raw analog sensor data to front end processing block 310.

The front end processing block 310 conditions the analog signal received from the image sensor and performs analog-to-digital (A/D) conversion. The front end processing block 310 can clamp the input signal, sample the clamped input signal, filter out thermal noise, attenuate low frequency drift, and convert the raw sensor data from analog format to digital format in an analog-to-digital converter (ADC), not shown. The raw digital data undergoes demosaicing (color filter array interpolation) to reconstruct a full red-green-blue (RGB) color image. Then, the front end processing block 310 can perform a mathematical coordinate transformation from the red-green-blue (RGB) color space to an associated YCbCr (luminance, blue difference, red difference) color space. The YCbCr space separates the luminance value from the color values. The luminance signal (Y) can be transmitted at high bandwidth or stored with high resolution, and two color components (Cb and Cr) can be bandwidth-reduced, subsampled, and compressed for more efficient transmission/storage. The YCbCr data 311 are output from the front end processing block 310.

The front end processing block 310 outputs the YCbCr data 311 to the YCbCr buffers 314 and to the jitter stabilized 3A statistics engine 312. The image enhancements block 316 can perform operations such as cropping, scaling (e.g., to a different resolution), image format conversion, color filtering, sharpening, or the like.

The EIS block 318 compares successive frames to determine a camera motion vector for the current frame, and adjusts the boundaries of the image window on the imaging sensor based on two successive frames. For example, EIS block 318 can compute the shift for motion compensation of the image window for the current frame based on image data from the current frame and the previous frame. (As noted above, the application of the ROI shift to the 3A engine 308 lags one frame behind applying the shift to the image window for the corresponding motion compensation.) In general, the EIS compensation based on a first frame of image data is used to shift an image window of the first frame, and the adjusted ROI—which is adjusted based on the EIS compensation—is applied to a second frame of image data following the first frame of image data. EIS block 318 outputs the first signal (e.g., motion vector) 319 to the jitter estimation block 324.

The jitter estimation block 324 receives motion data 305 from the motion (inertial) sensor 302 (e.g., gyroscope 116 and/or accelerometer 117 from FIG. 1) and the first signal (e.g., calculated motion vector) 319 from EIS block 318. The jitter estimation block 324 computes and outputs the estimated jitter 325 based on both motion data 305 and motion vector 319. For example, jitter estimation block 324 can compute a weighted average of the motion data 305 from the inertial sensor 302 and the calculated motion vector 319 from the EIS block 318.

The ROI adjuster 320 receives the estimated jitter 325 and determines the adjusted AF ROI, AE ROI and AWB ROI to be applied to the next image frame. The ROI adjuster outputs information 321, which can identify the new ROI boundaries, or identify the change in the ROI boundaries.

Block 312 receives the YCbCr image data from the front end processing block 310 and the new ROI boundaries or the change in the ROI boundaries from the ROI adjuster 320. Based on the new ROI boundaries or the changes in the ROI boundaries, jitter stabilized 3A statistics block 312 determines from which pixels the YCbCr image data is used by the 3A engine 308 for determining the AF, AE and AWB settings for the next image frame. Jitter stabilized 3A statistics block 312 computes the motion compensated image statistics (e.g., histogram data) using the adjusted image window and adjusted ROIs 321

Video encoder block 322 converts raw (uncompressed) digital video to compressed video signals. For example, the video encoder block 322 can be an (ISO/IEC 14496) MPEG-4 encoder.

Video buffers and bitstream 326 store video or graphics information as it moves from the video encoder to the display screen or storage medium. The video buffers gather all information before the information is to be displayed or stored, to accommodate any mismatch between the speed at which the encoded video is output from video encoder block 322 and the speed at which a display or storage medium can receive the video data.

To support jitter stabilized AE and AWB, capture control block 135 of FIG. 1 is configured to allow the ROI adjuster to adjust the AF ROI, AE ROI and AWB ROI after each image frame. Capture control block 135 is also configured to initiate processing by 3A engine 308 before every succeeding image frame, based on the adjusted AF ROI, adjusted AE ROI and adjusted AWB ROI. As a result, the exposure speed and white balance can be maintained at proper levels for the scene, even while the camera is moving relative to the scene, and the image window is shifting.

FIG. 4 is a flow chart of the jitter estimation block 324. Jitter estimation block 324 receives sensor data 305 from the inertial sensor 302 (e.g., gyroscope and/or accelerometer), shown in FIG. 3.

Decision block 330 determines whether there is significant jitter present. Jitter is considered insignificant if the motion sensor output signals 305 cannot be distinguished from thermal noise. In response to a determination that there is no significant jitter present, block 331 is executed, and the previous (uncompensated) ROI boundary is used. In response to a determination that there is significant jitter present, block 332 is executed, and a jitter-compensated ROI boundary is computed. Following execution of block 331 or 332, the adjusted ROI boundary 321 is output.

Figure 5:
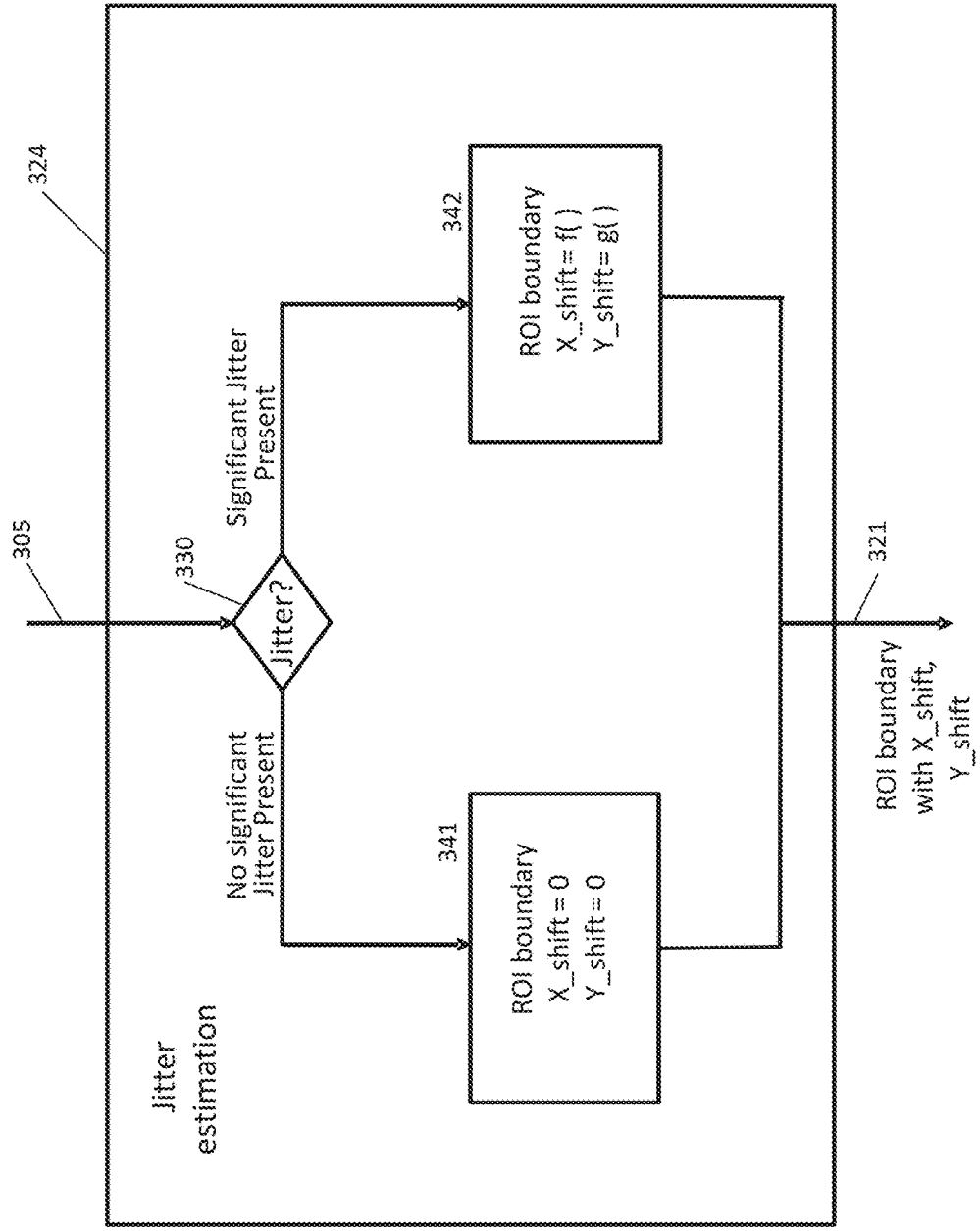
FIG. 5 shows an example of the jitter estimation method of FIG. 4 applied to a jitter profile indicating the image capture device is translating without rotating.

FIG. 5 is a flow chart of an example of a boundary change computation in the case where the jitter includes a translation without a rotation. Jitter estimation block 324 receives sensor data 305 from inertial sensor (the gyroscope and/or accelerometer 302) (shown in FIG. 3).

Decision block 330 determines whether there is significant jitter present. In response to a determination that there is no significant jitter present, block 341 is executed. The shift in the X direction is set to zero, and the shift in the Y direction is set to zero. In response to a determination that there is significant jitter present, block 342 is executed. The shift in the X direction is computed as a function f( ) based on sensor data 305 and the first signal 319 output by EIS block 318, and the shift in the Y direction is computed as a function g( ) based on sensor data 305 and EIS block output (first signal 319). The functions f( ) and g( ) are the techniques within the EIS block that take both the sensor data 305 and EIS block output (first signal 319) into account in determining the motion compensation shift. Following execution of block 341 or 342, the adjusted ROI boundary 321 (including the shift in the X direction and the shift in the Y direction) is output.

Figure 6:
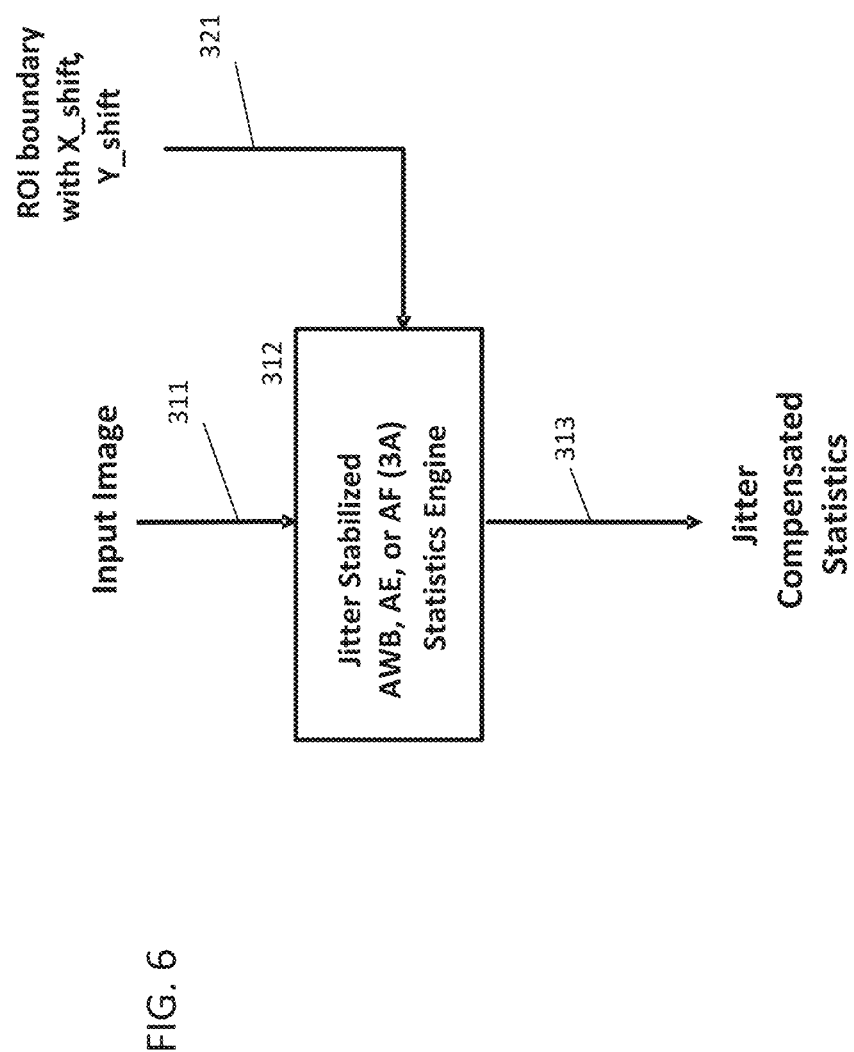
FIG. 6 is a diagram of the jitter stabilized automatic white balance, automatic exposure, or automatic focus statistics engine of FIG. 3B.

FIG. 6 is a diagram of the jitter stabilized 3A statistics engine 312 of FIG. 3B. The jitter stabilized 3A statistics engine 312 receives the YCbCr image data 311 for the image frame currently being captured and the adjusted ROI boundary 321 (including X shift and Y shift) for the next image frame to be captured. The jitter stabilized 3A statistics engine 312 outputs the jitter compensated image statistics 313 to be used by the 3A (AE, AWB, AF) block 308, which reflect the stabilized image window determined by EIS block 318 during processing of the current image frame.

FIG. 7 is a flow chart of an exemplary method for finding the X shift and Y shift in an image capture device 100 having a motion (inertial) sensor (e.g., gyroscope 116 and/or accelerometer 117 of FIG. 1).

At block 702, the jitter estimation block 146 of FIG. 1 sums pixel values across each individual row of the imaging sensor for a first image frame to provide a first vector.

At block 704, the jitter estimation block 146 of FIG. 1 sums pixel values across each individual column of the imaging sensor for the first image frame, to provide a second vector;

At block 706, the jitter estimation block 146 of FIG. 1 sums pixel values across each individual row of the imaging sensor for a second image frame to provide a third vector.

At block 708, the jitter estimation block 146 of FIG. 1 sums pixel values across each individual column of the imaging sensor for the second image frame, to provide a fourth vector.

At block 710, the jitter estimation block 146 of FIG. 1 compares the first vector to the third vector.

At block 712, the jitter estimation block 146 of FIG. 1 determines the Y shift from the difference vector between the first vector and the third vector. The shift is indicated by the substantially non-zero values in the difference vector.

At block 714, the jitter estimation block 146 of FIG. 1 compares the second vector to the fourth vector, to determine the jitter or panning shift.

At block 716, the jitter estimation block 146 of FIG. 1 determines the X shift from the difference vector between the second vector and the fourth vector. The shift is indicated by the substantially non-zero values in the difference vector.

The jitter estimation method of FIG. 7 is just one example, and other jitter estimation methods can be used.

In the examples described above, the ROI adjuster block 147 can adjust the AE ROI, AWB ROI, AF ROI and image window to be different from each other. In other examples, the adjusted AWB ROI is set to be the same as the adjusted imaging window, to optimize the white balance across the entire image.

The methods described herein can provided jitter stabilized exposure and white balance for video and still images collected in burst mode. When electronic image stabilization shifts the image window, the jitter stabilized AE adjustments and AWB adjustments ensure that the light levels and white balance of the collected image frames remain steady.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method for image capture control, comprising:
computing an electronic image stabilization (EIS) compensation based on image data from an image capture device, the image data having a first region of interest (ROI);
receiving first sensor data from a first inertial sensor;
computing a jitter or panning shift based on the first sensor data and the EIS compensation, wherein computing the jitter or panning shift comprises sensing a motion of the image capture device based on the first sensor data, and dividing the motion of the image capture device into a panning shift component and a jitter component based on the first sensor data and the EIS compensation; and
adjusting the first ROI based on the jitter or panning shift, wherein adjusting the first ROI compensates for the jitter component without compensating for the panning shift component.

2. The method for image capture control according to claim 1, further comprising adjusting a second ROI for use in autofocus control, wherein the first ROI and the second ROI for a single image frame are different from each other.

3. The method for image capture control according to claim 1, further comprising receiving second sensor data from at least a second inertial sensor for use in computing the jitter or panning shift.

4. The method for image capture control according to claim 1, further comprising computing histogram data used to calculate an exposure time and/or a color temperature for an image frame based on the adjusted ROI, in response to the adjusted ROI.

5. The method for image capture control according to claim 4, wherein the first ROI comprises image data within a field of view of at least 95% of a plurality of imaging pixels in an image sensor of the image capture device.

6. The method for image capture control according to claim 1, wherein:
the EIS compensation based on a first frame of image data is used to shift an image window of the first frame; and
the adjusted ROI is applied to a second frame of image data following the first frame of image data.

7. The method for image capture control according to claim 1, wherein the image capture device has an imaging sensor, and computing the jitter or panning shift includes:
summing pixel values across each individual row of the imaging sensor for a first image frame to provide a first vector;
summing pixel values across each individual column of the imaging sensor for the first image frame to provide a second vector;
summing pixel values across each individual row of the imaging sensor for a second image frame to provide a third vector;
summing pixel values across each individual column of the imaging sensor for the second image frame to provide a fourth vector; and
comparing the first vector to the third vector and comparing the second vector to the fourth vector[H] to determine the jitter or panning shift.

8. An image capture control apparatus, comprising:
a memory; and
at least one processor coupled to the memory, the at least one processor configured to:
compute an electronic image stabilization (EIS) compensation based on image data received from an image capture device, the image data having a first region of interest (ROI);
receive first sensor data from at least one inertial sensor;
compute a jitter or panning shift based on the first sensor data and the EIS compensation, wherein computing the jitter or panning shift comprises sensing a motion of the image capture device based on the first sensor data, and dividing the motion into a panning shift component and a jitter component based on the first sensor data and the EIS compensation; and
compute an adjusted ROI based on the jitter or panning shift, wherein the adjusted ROI compensates for the jitter component without compensating for the panning shift component.

9. The image capture control apparatus of claim 8, wherein the processor is further configured to:
shift an image window of a first frame of image data based on a first frame of image data; and
apply the adjusted ROI to a second frame of image data following the first frame of image data.

10. The image capture control apparatus of claim 8, wherein the processor is further configured to:
compute histogram data used to calculate an exposure time or a color temperature for an image frame based on the adjusted ROI.

11. The image capture control apparatus of claim 8, wherein the processor is further configured to:
select an autofocus ROI to be used by an autofocus control system of the image capture device, such that the autofocus ROI is different from the first ROI and different from the adjusted ROI.

12. The image capture control apparatus of claim 11, wherein the processor is further configured to:
select an adjusted ROI larger than the autofocus ROI.

13. An image capture control apparatus, comprising:
means for computing an electronic image stabilization (EIS) compensation based on image data from an image capture device, the image capture device including an imaging sensor comprising a plurality of buffer pixel rows and buffer pixel columns at a periphery of the imaging sensor, the image data having a first region of interest (ROI);
means for receiving first sensor data from a first inertial sensor;
means for estimating a jitter or panning shift based on the first sensor data and the EIS compensation, comprising sensing a motion of the image capture control apparatus based on the first sensor data, and dividing the motion into a panning shift component and a jitter component based on the first sensor data and the EIS compensation; and
means for computing an adjusted ROI based on the jitter or panning shift wherein the adjusted ROI compensates for the jitter component without compensating for the panning shift component.

14. The image capture control apparatus of claim 13, further comprising means for computing an exposure time and a color temperature for an image frame using image data corresponding to the adjusted ROI.

15. The image capture control apparatus of claim 13, wherein the image capture device comprises means for selecting an autofocus ROI to be used by an autofocus control system of the image capture device, such that the autofocus ROI is different from the first ROI and different from the adjusted ROI.

16. The image capture control apparatus of claim 15, wherein the means for computing the adjusted ROI is configured to select the adjusted ROI to be larger than the autofocus ROI.

17. A non-transitory, machine-readable storage medium encoded with program code for image capture control, wherein the program code comprises:
code for computing an electronic image stabilization (EIS) compensation based on image data from an image capture device, the image data having a first region of interest (ROI);
code for receiving first sensor data from a first inertial sensor;
code for computing a jitter or panning shift based on the first sensor data and the EIS compensation, including sensing a motion of the image capture device based on the first sensor data, and dividing the motion of the image capture device into a panning shift component and a jitter component based on the first sensor data and the EIS compensation; and
code for adjusting the first ROI based on the jitter or panning shift, wherein adjusting the first ROI compensates for the jitter component without compensating for the panning shift component.

18. The non-transitory, machine-readable storage medium according to claim 17, further comprising code for adjusting a second ROI for use in autofocus control, wherein the first ROI and the second ROI for a single image frame are different from each other.

19. The non-transitory, machine-readable storage medium according to claim 18, wherein the first ROI is larger than the second ROI.

20. The non-transitory, machine-readable storage medium according to claim 18, wherein the first ROI is a center region of the single image frame.

21. The method for image capture control according to claim 1, wherein the image capture device includes an imaging sensor comprising a plurality of buffer pixel rows and buffer pixel columns at a periphery of the imaging sensor, and wherein the adjusted first ROI includes at least one of the buffer pixel rows or at least one of the buffer pixel columns.

22. The method for image capture control according to claim 1, wherein the adjusting comprises adjusting the first ROI for use in at least one of the group consisting of an automatic white balance process and an automatic exposure process of the image capture device.

23. The image capture control apparatus of claim 9, wherein:
the image capture device includes an imaging sensor comprising a plurality of buffer pixel rows and buffer pixel columns at a periphery of the imaging sensor; and
the at least one processor is further configured to compute the adjusted ROI for use in at least one of the group consisting of an automatic white balance process and an automatic exposure process of the image capture device, the adjusted ROI comprising at least one of the buffer pixel rows or at least one of the buffer pixel columns.

24. The image capture control apparatus of claim 13, wherein:
the image capture device includes an imaging sensor comprising a plurality of buffer pixel rows and buffer pixel columns at a periphery of the imaging sensor; and
the means for computing the adjusted ROI is configured to compute the adjusted ROI for use in at least one of the group consisting of an automatic white balance process and an automatic exposure process of the image capture device, the adjusted ROI comprising at least one of the buffer pixel rows or at least one of the buffer pixel columns.

25. The non-transitory, machine-readable storage medium according to claim 17, wherein:
the image capture device includes an imaging sensor comprising a plurality of buffer pixel rows and buffer pixel columns at a periphery of the imaging sensor; and
the non-transitory, machine-readable storage medium further comprises code for adjusting the first ROI for use in at least one of the group consisting of an automatic white balance process and an automatic exposure process of the image capture device, the adjusted first ROI comprising at least one of the buffer pixel rows or at least one of the buffer pixel columns.

* * * * *